F. SIEMENS.
Hardening, Tempering and Pressing Glass.
No. 199,583. Patented Jan. 22, 1878.
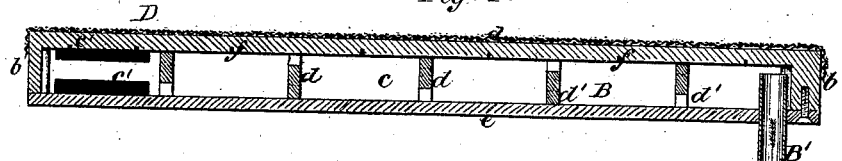
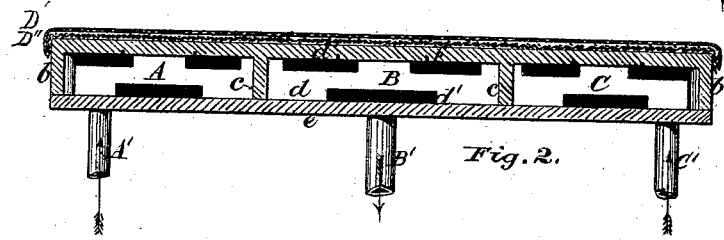
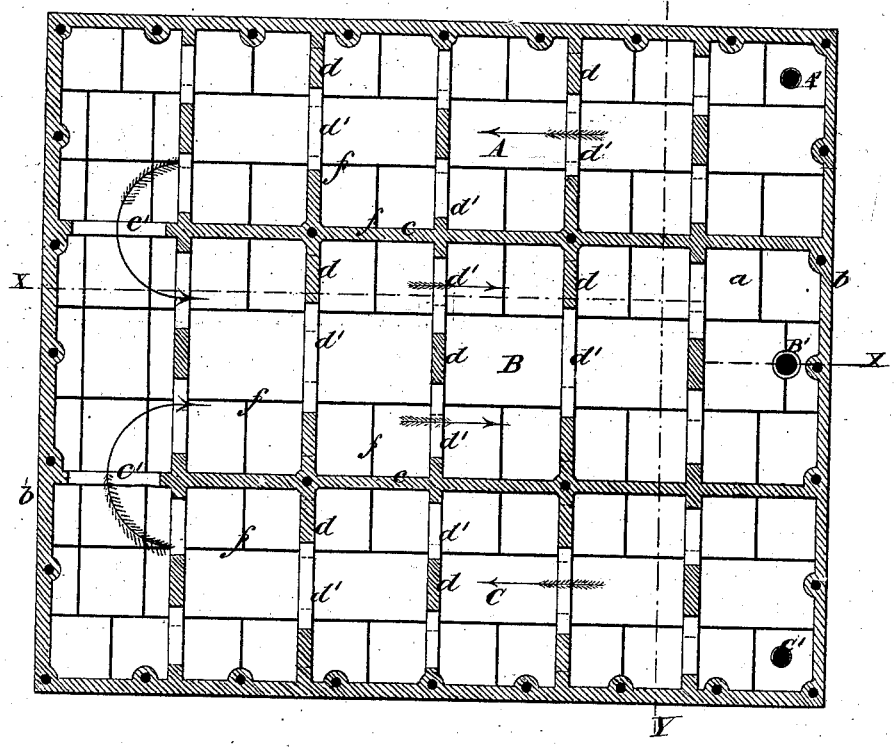
Witnesses:
A. H. Norris
James M. Wright Jr
Frederick Siemens,
Inventor;
by James L. Norris
Atty.

UNITED STATES PATENT OFFICE.

FREDERICK SIEMENS, OF DRESDEN, GERMANY.

IMPROVEMENT IN HARDENING, TEMPERING, AND PRESSING GLASS.

Specification forming part of Letters Patent No. 199,583, dated January 22, 1878; application filed November 14, 1877.

*To all whom it may concern:*

Be it known that I, FREDERICK SIEMENS, of Dresden, in the German Empire, have invented an Improvement in Hardening, Tempering, and Pressing Glass; and do hereby declare that the following description, taken in connection with the accompanying drawings, forms a full and exact specification of the same, wherein I have set forth the nature and principles of my said improvement, by which my invention may be distinguished from others of a similar class, together with such parts as I claim and desire to secure by Letters Patent.

In the specification to a patent granted to me on the 26th June, 1877, No. 192,537, I described an improved process for hardening and tempering glass by pressing it, when in a highly-heated condition, in molds at a lower temperature. In carrying this process into practice I have found that certain improvements in the method of operating are desirable for insuring perfect success and the highest obtainable resistance to fracture in the product.

In order to effect the hardening of the glass with safety and diminish the chances of fracture, particularly when glass sheets of large dimension are operated upon, I have found that it is advisable to modify the nature of the surfaces of the pressing-molds, or to prepare them in a peculiar manner, according to the thickness and size of the glass to be operated upon, and also according to its physical qualities and composition.

In order to obviate too sudden a cooling it is necessary to prevent the immediate contact of the glass operated on with the surfaces of the pressing-molds themselves. For this purpose I interpose between the pressing-molds and the glass a sheet or layer of suitable material, of a pliable nature, which can perfectly assume the configuration of the glass article, and isolates it, to a certain extent, from the pressing-mold. I employ for this purpose, according to the nature and composition of the glass, either a thin sheet of perforated metal or fine wire-gauze of any suitable metal, or a sheet of textile fabric, such as cloth, canvas, paper, &c.; or, again, a finely-pulverized substance, such as plaster-of-paris, talc, or soapstone, &c.; or, lastly, a substance in a state of solution applied in the form of a varnish or coating, either on the glass itself or on the pressing-molds.

When an energetic cooling requires to be effected the glass is only separated from the pressing-molds by a single thickness of metal tissue or other substance, or by a thin coating of the above-mentioned substances.

If, on the other hand, it be desired that the cooling shall take place slowly, two or more thicknesses of tissue or a thicker coating of the material is used.

In all cases the nature of the tissue or the coating of the material used should vary with the desired rapidity and energy of the cooling, and with the nature and composition of the glass.

It is sometimes advisable, in order to prevent the warping or getting out of shape of the glass articles, to apply to the surface of the glass a layer or sheet of one description of the before-mentioned materials, while between this and the surface of the mold is interposed a layer or sheet of material of a different description. Thus, for example, for operating on curved glass I place upon the glass a coating of plaster-of-paris, while upon the surface of the mold I place a coating or sheet of wire-gauze.

Thus, by the careful choice of the tissues or substances interposed, or by the combination of the various means above indicated, it is easy in each case to obtain a perfectly suitable cooling for every form and description of the glass operated upon.

Practice has proved that this process presents great advantages, both as regards a considerable reduction of the breakages during and after the operation and as regards the intensity and uniformity of the hardening. The influence of this process is strikingly shown by the fact that it is only by this means that the fibrous fracture can be imparted to thick glass, which generally characterizes the glass treated according to my hardening process.

I have found during the process of manufacture that the use of pressing-molds cooled artificially is very advantageous in connecting with the linings or interposed layer or layers, as such molds can thus be maintained at a uniform temperature and be used for a much greater length of time without being changed, and the exact temperature at which the mold may be kept for any given time being known, the nature of the lining or layer or layers proper to be used in connection therewith, as heretofore explained, may be definitely determined with respect to the effect sought.

I employ for such cooling, according to the nature of the article to be cooled, either water, steam, vapor, or gas, at a suitable temperature. I employ water in pressing-molds that are open, as mentioned in my before-cited previous patent, or I use it in the form of constant currents in closed hollow molds, and I find it particularly advantageous to employ such cooling-liquids at a temperature below that of boiling water.

The accompanying drawings show the construction of a pressing-mold, such as I employ for the purposes of my invention.

Figure 1 shows a longitudinal section on line X X, Fig. 3; Fig. 2, a cross-section on line Y Y, and Fig. 3 a sectional plan, showing the inner surface of the top side.

The mold here represented is adapted for operating on flat sheet-glass or plate-glass, and it is to be understood that two such molds are used—one upon which the glass is placed, this being the one represented in the drawings, and which may be termed the "table-mold," and the other for placing upon the top of the glass, the two molds being pressed together by any suitable known means when in this position, so as to subject the glass between them to the required pressure.

The mold consists of a rectangular cast-iron box, which may be conveniently formed by making the top $a$ and sides $b$, together with the partitions $c\ d$, of one casting, and securing the plate $e$, forming the under side, in a water-tight manner by screwing or otherwise. To insure a perfect circulation of the water through the mold, so as to maintain it at a uniform temperature, it is divided into three compartments, A B C, of which the two side ones A C are connected by pipes A′ C′ with the supply-reservoir, while the middle one has a pipe, B′, for the escape of the water.

A and C communicate with B through openings $c'\ c'$ formed in the partitions $c\ c$, at the opposite end to that where the inlet and outlet pipes are situated, and in order to insure that the incoming water shall be uniformly distributed over the whole surface of each compartment, cross-partitions $d\ d$ are provided therein, having apertures $d'$ at top and bottom, in alternating positions, so as to cause the water to flow in a zigzag direction, both laterally and up and down. By the latter motion the cooling power of the under surface of the mold, which is kept cool by the air, is utilized, the water in descending from the top surface to the bottom one becoming cooled thereby.

D, in Fig. 1, designates a single sheet of fine wire-gauze, with which the face of the mold is covered. D′ D″, Fig. 2, indicate two layers, one, D′, of fine wire-gauze, and the other, D″, of canvas, with which the mold is to be covered in certain cases heretofore referred to.

A certain quantity of air is always carried along by the water, which, in expanding in the mold by the heat, might form a layer of air, interposed between the cooling water and the top inner surface of the mold, and thus seriously interfere with the cooling action of the water. To prevent this, small grooves $f\ f$ are cut in the top inner surface, as shown, in which any such air collects, and is readily carried along therein from the inlet to the outlet apertures. At the latter the pipe B′ is carried up to near the top inner surface, so that the restricted area for the outlet thus formed causes an acceleration of the current, whereby the air is readily drawn down into the outlet-pipe.

The top mold is of precisely the same construction as that shown, with the exception that the inlet and outlet pipes are made to project laterally from the end surfaces instead of downward, and that the grooves $f$ are dispensed with, as the accumulation of air, being, in this case, against the surface of the mold which does not come in contact with the glass, has no prejudicial effect. The inlet and outlet pipes of both molds are provided with cocks or valves, whereby the circulation of water, and, consequently, the temperature of the mold, can be regulated to the exact degree required. The top mold may be conveniently hinged at one side to the table, and provided with a balance-weight on the opposite side of the hinge, so that it can readily be lowered and raised to and from the glass on the lower mold.

Having thus described the nature of the said invention, and in what manner the same is to be performed, I claim, in respect of the process of hardening, tempering, and pressing glass, hereinbefore referred to—

1. The improvement in the art of pressing glass, substantially as described, the same consisting in covering or lining the face of the pressing-mold with one or more sheets or layers of metal or vegetable fabric, powder, or solution, for the purpose set forth.

2. A pressing-mold, having its inner surface covered by one or more sheets, layers, or coatings of a substance or combination of substances that will retard or modify the action of the mold upon the article to which it is applied.

3. The method of applying to the surface of the glass a sheet, layer, or coating of material, having a different heat-conducting power from a sheet, layer, or coating applied to the surface of the molds, substantially as herein described.

4. The improvement in the art of pressing glass, consisting in maintaining the pressing-mold for desired periods during the pressing at given degrees of temperature below the boiling-point of water, substantially as set forth.

5. A hollow pressing-mold, maintained at a constant temperature by the circulation through it of water or other liquid, substantially as herein described.

6. A hollow glass pressing-mold, adapted for circulation of water through its interior, and having its face covered by one or more sheets or layers of metal-gauze, fibrous or textile fabric, powder, or solution, substantially as set forth.

In testimony whereof I have signed my name to this specification in the presence of two subscribing witnesses this 27th day of October, 1877.

FREDERICK SIEMENS.

Witnesses:
PAUL KASTEN,
L. KLEMPERER.